(12) United States Patent
Taubman

(10) Patent No.: US 9,443,514 B1
(45) Date of Patent: Sep. 13, 2016

(54) DYNAMIC VOICE RESPONSE CONTROL BASED ON A WEIGHTED PACE OF SPOKEN TERMS

(75) Inventor: Gabriel Taubman, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 1132 days.

(21) Appl. No.: 13/368,681

(22) Filed: Feb. 8, 2012

(51) Int. Cl.
*G10L 21/00* (2013.01)
*G06F 15/00* (2006.01)
*G10L 15/22* (2006.01)
*G06F 3/16* (2006.01)

(52) U.S. Cl.
CPC ........ *G10L 15/22* (2013.01); *G06F 3/16* (2013.01)

(58) Field of Classification Search
CPC .................................. G10L 15/22; G06F 3/16
USPC .................................................. 704/270, 200
See application file for complete search history.

(56) References Cited

U.S. PATENT DOCUMENTS

| 2004/0215453 A1* | 10/2004 | Orbach .......... G10L 15/005 704/231 |
| 2006/0287850 A1* | 12/2006 | Morikawa .................. 704/200 |
| 2012/0030682 A1* | 2/2012 | Shaffer et al. ............. 718/103 |
| 2013/0158707 A1* | 6/2013 | Lee et al. .................. 700/246 |

* cited by examiner

*Primary Examiner* — Farzad Kazeminezhad
(74) *Attorney, Agent, or Firm* — Shumaker & Sieffert, P.A.

(57) ABSTRACT

A system is configured to obtain a first voice request, from a client, to access a voice processing system that processes voice communications received from clients; determine a first pace at which terms, associated with the first voice request, are spoken by a user of the client; determine a second pace, associated with the user, based on terms, associated with other voice requests, spoken by the user and users of the clients prior to receiving the first voice request by using a weighted average of the pace associated with the user of the client and a pace associated with the users of the clients other than the client; compare the first pace to the second pace; determine a third pace based on the comparison; and send, to the client, a voice response to be outputted at the third pace.

29 Claims, 8 Drawing Sheets

| CLIENT ID<br>405 | USER<br>INFORMATION<br>410 |
| --- | --- |
| LANGUAGE<br>415 | GENDER<br>420 |
| LOCATION<br>425 | AGE<br>430 |
| USER<br>PACE<br>435 | NORMAL<br>PACE<br>440 |

DYNAMIC VOICE RESPONSE CONTROL BASED ON A WEIGHTED PACE OF SPOKEN TERMS

BACKGROUND

Users of user devices may communicate with public and/or proprietary networks to interact with service providers to access services, such as to download and/or run applications, to place and/or receive calls, to send and/or receive messages, to order goods and/or services, to make electronic purchases, etc. The users may sometimes access the services, from the service providers, by interacting with voice processing systems associated with the service providers. The voice processing systems may permit the users to request the services by speaking the requests to the voice processing systems. The voice processing systems may receive the requests, spoken by the users, and may process the requests using, for example, speech recognition technology to identify which services the users desire to access. The voice processing systems may provide voice responses, generated by the voice processing systems, to the users based on the identification of the services that the users desire to access.

SUMMARY

According to one possible implementation, a method may be performed by one or more server devices associated with a voice processing system. The method may include obtaining, by at least one of the one or more server devices and from a client device, a first voice request to access a voice processing system that processes voice communications received from client devices; and determining, by at least one of the one or more server devices and in response to the first voice request, a first pace at which terms, associated with the first voice request, are spoken by a user of the client device. The method may further include determining, by at least one of the one or more server devices, a second pace, where the second pace is based on at least one of: terms spoken, by the user when accessing the voice processing system, prior to the first voice request being received, terms spoken by users of the client devices when accessing the voice processing system, terms spoken by a set of the users of a same language, age group, or gender as the user when accessing the voice processing system, or terms spoken by a set of the users of a same geographic area as the user when accessing the voice processing system. The method may still further include comparing, by at least one of the one or more server devices, the first pace to the second pace; determining, by at least one of the one or more server devices, a third pace based on the comparison of the first pace to the second pace; and sending, to the client device, a voice response to be outputted at the third pace.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements.

A system and/or method may include a voice processing system that receives a request from a client, determine a pace associated with the request, hereinafter referred to as a "request pace", and provide, to the client, a voice response at another pace, hereinafter referred to as "a response pace" that is based on the request pace. The voice processing system may, for example, identify a normal pace associated with a user that provided the request via the client. The normal pace may be based on request paces, associated with requests, that are spoken by users, of other clients, of a same gender, range of age, geographic location, language and/or dialect, etc., as the user. The term request, has described herein, may include audio content, such as terms spoken by a user of the client; image content, such as an image of the user; video content, such as a video of the user; and/or biometric content, such as a heart rate, breathing rate, fingerprints, facial features, etc. associated with the user.

The voice processing system may compare the request pace to the normal pace to identify whether the request pace is less than the normal pace, approximately equal to the normal pace, or greater than the normal pace. The voice processing system may, based on the request pace, provide the voice response in a manner that instructs the client to output the voice response at a response pace that is less than a standard pace, approximately equal to the standard pace, or greater than the standard pace. The standard pace may correspond to a response pace that is provided, by the voice processing system, when the request pace is approximately equal to the normal pace and/or at a response pace that the voice response system regularly responds to voice requests. Additionally, or alternatively, the voice processing system may provide the voice response at the response pace that is less than the standard pace when the request pace is less than the normal pace. Additionally, or alternatively, the voice processing system may provide the voice response at the response pace that is greater than the standard pace when the request pace is greater than the normal pace. The system and/or method may allow the voice processing system to use biometric information, associated with the user, to determine whether to increase the response pace, decrease the response pace, or permit the response pace to be transmitted without being increased or decreased.

Providing the voice response at the response pace that is based on the request pace relative to the normal pace may improve a user experience when interacting with the voice processing system.

Figure 1:
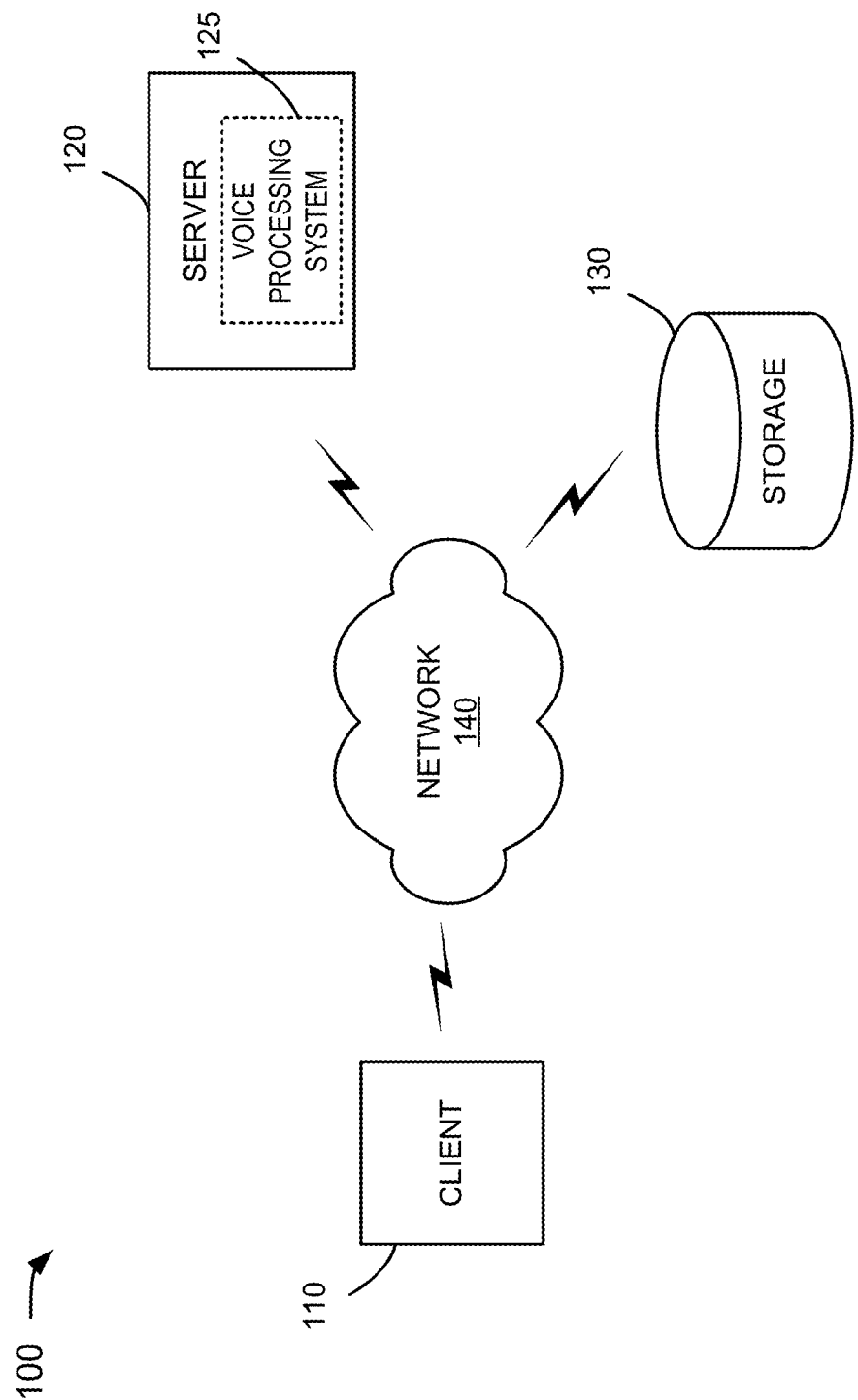
FIG. 1 is a diagram of an example network in which systems and/or methods described herein may be implemented.

FIG. 1 is a diagram of an example environment 100 in which systems and/or methods described herein may be implemented. Environment 100 may include client 110, server 120, and a storage 130 interconnected by network 140. The quantity of devices within environment 100 is provided for explanatory purposes. In other implementations, there may be fewer devices, additional devices, different devices, and/or differently arranged devices than are provided in environment 100.

Also, in some implementations, one or more of the devices, of environment 100, may perform one or more functions described as being performed by another one or more devices of environment 100. Also, or alternatively, while server 120 is shown as a single device, it may be possible for server 120 to be implemented as two or more separate and/or possibly distributed devices. The devices of environment 100 may interconnect via wired connections, wireless connections, or a combination of wired and wireless connections.

Client 110 may include one or more devices that access server 120. Client 110 may include, for instance, a personal computer, a wireless telephone, a personal digital assistant (PDA), a laptop, a smart phone, a tablet computer, a camera, or another type of computation or communication device. Client 110 may allow a user, of client 110, to interact with server 120 by sending or receiving electronic messages, sending voice signals spoken by the user, receiving voice signals generated by server 120, sending and/or receiving video content, etc. Client 110 may send video and/or image signals (e.g., associated with user facial features, movement, etc.) to server 120. Client 110 may receive biometric information, associated with the user (e.g., a fingerprint, a heart rate, a breathing rate, etc.), and may send the biometric information to the server 120. Client 110 may register with server 120 and may provide, to server 120, information associated with client 110, such as a device identifier, a network address, etc., and/or information associated with a user of client 110, such as a username, a password, a gender, a language spoken, a physical address, an age, biometric information, an image, video content, etc.

Server 120 may include one or more server devices, or other types of computation or communication devices, that gather, process, search, store, and/or provide information in a manner described herein. Server 120 may, for example, provide one or more services to client 110 in response to a request for services received from client 110. The services may allow client 110 to access to an application, place an order for a good and/or service, place and/or receive a call, send and/or receive a message, such as an instant message, an email message, etc., perform a search, navigate a web page, and/or access some other service.

Server 120 may include a voice processing system 125 that processes requests for services received from client 110. The requests for services may generally correspond to requests that are spoken by a user (hereinafter referred to as "requests"), of client 110, and received, by voice processing system 125, as audio content. Voice processing system 125 may include one or more components associated with speech recognition, speech synthesis, etc. that allows voice processing system 125 to receive and/or process requests. Additionally, or alternatively, the requests may include image and/or video content associated with the user. Additionally, or alternatively, the request may include biometric information associated with the user, such as a finger print, a heart rate, a breathing rate, etc.

Voice processing system 125 may process the requests by identifying a normal pace associated with the user. Voice processing system 125 may also, or alternatively, determine a request pace at which the request was spoken by the user relative to the normal pace associated with the user. Voice processing system 125 may identify a response pace associated with a response, generated by voice processing system 125, that is to be provided to client 110 in response to the request. The response pace may be based on the request pace relative to the normal pace.

Storage 130 may include one or more devices that store information and/or data received via network 140. Storage 130 may store speech profiles associated with users of clients 110 that have accessed server 120. The speech profiles may identify normal paces associated with the users, languages spoken by the users, dialects spoken by the users, geographic areas in which clients 110 are located, genders associated with the users, etc.

Network 140 may include a local area network (LAN), a wide area network (WAN), a metropolitan area network (MAN), a telephone network, such as the Public Switched Telephone Network (PSTN) or a Public Land Mobile Network (PLMN), an intranet, the Internet, a memory device, or a combination of networks.

Figure 2:
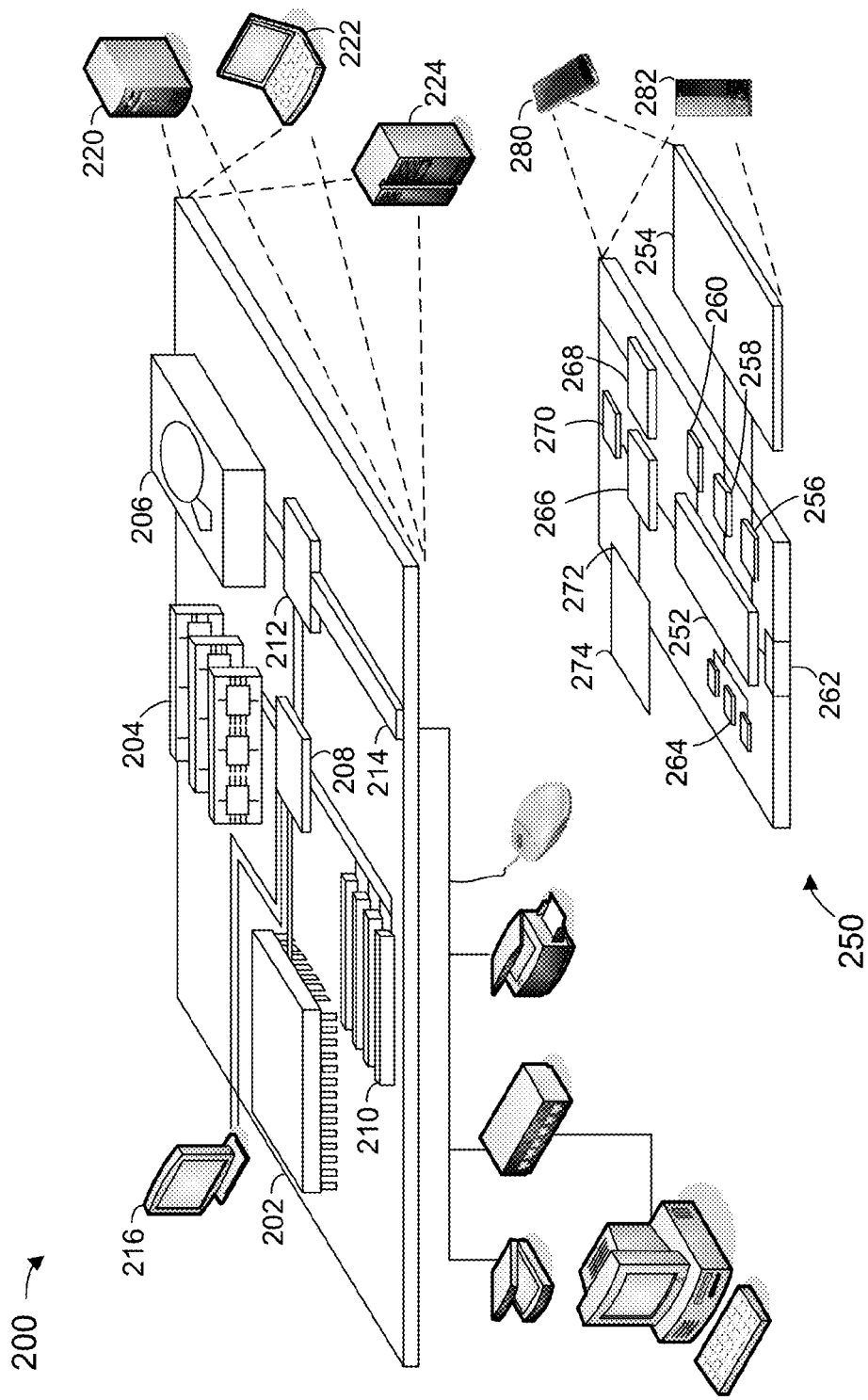
FIG. 2 is a diagram of example components of one or more of the devices depicted in FIG. 1.

FIG. 2 is a diagram of an example of a generic computing device 200 and a generic mobile computing device 250, which may be used with the techniques described here. Generic computing device 200 or generic mobile computing device 250 may correspond to, for example, a client 110 and/or a server 120. Computing device 200 is intended to represent various forms of digital computers, such as laptops, desktops, workstations, personal digital assistants, servers, blade servers, mainframes, and other appropriate computers. Mobile computing device 250 is intended to represent various forms of mobile devices, such as personal digital assistants, cellular telephones, smart phones, and other similar computing devices. The components shown in FIG. 2, their connections and relationships, and their functions, are meant to be examples only, and are not meant to limit implementations described herein.

Computing device 200 may include a processor 202, memory 204, a storage device 206, a high-speed interface 208 connecting to memory 204 and high-speed expansion ports 210, and a low speed interface 212 connecting to low speed bus 214 and storage device 206. Each of the components 202, 204, 206, 208, 210, and 212, are interconnected using various busses, and may be mounted on a common motherboard or in other manners as appropriate. Processor 202 can process instructions for execution within the computing device 200, including instructions stored in the memory 204 or on the storage device 206 to display graphical information for a graphical user interface (GUI) on an external input/output device, such as display 216 coupled to high speed interface 208. In other implementations, multiple processors and/or multiple buses may be used, as appropriate, along with multiple memories and types of memory. Also, multiple computing devices 200 may be connected, with each device providing portions of the necessary operations, as a server bank, a group of blade servers, or a multi-processor system, etc.

Memory 204 stores information within the computing device 200. In one implementation, memory 204 includes a volatile memory unit or units. In another implementation, memory 204 includes a non-volatile memory unit or units. The memory 204 may also be another form of computer-readable medium, such as a magnetic or optical disk. A computer-readable medium may refer to a non-transitory memory device. A memory device may refer to storage space within a single storage device or spread across multiple storage devices.

The storage device 206 is capable of providing mass storage for the computing device 200. In one implementation, storage device 206 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described herein. The information carrier is a computer or machine-readable medium, such as memory 204, storage device 206, or memory on processor 202.

High speed controller 208 manages bandwidth-intensive operations for the computing device 200, while low speed controller 212 manages lower bandwidth-intensive operations. Such allocation of functions is exemplary only. In one implementation, high-speed controller 208 is coupled to memory 204, display 216, such as through a graphics processor or accelerator, and to high-speed expansion ports 210, which may accept various expansion cards (not shown). In this implementation, low-speed controller 212 is coupled to storage device 206 and low-speed expansion port 214. The low-speed expansion port, which may include various communication ports, such as USB, Bluetooth, Ethernet, wireless Ethernet, etc., may be coupled to one or more input/output devices, such as a keyboard, a pointing device, a scanner, or a networking device such as a switch or router, e.g., through a network adapter.

Computing device 200 may be implemented in a number of different forms, as shown in the figure. For example, it may be implemented as a standard server 220, or multiple times in a group of such servers. It may also be implemented as part of a rack server system 224. In addition, it may be implemented in a personal computer such as a laptop computer 222. Alternatively, components from computing device 200 may be combined with other components in a mobile device (not shown), such as mobile computing device 250. Each of such devices may contain one or more of computing devices 200, 250, and an entire system may be made up of multiple computing devices 200, 250 communicating with each other.

Mobile computing device 250 may include a processor 252, memory 264, an input/output ("I/O") device such as a display 254, a communication interface 266, and a transceiver 268, among other components. Mobile computing device 250 may also be provided with a storage device, such as a micro-drive or other device, to provide additional storage. Each of the components 250, 252, 264, 254, 266, and 268 are interconnected using various buses, and several of the components may be mounted on a common motherboard or in other manners as appropriate.

Processor 252 can execute instructions within mobile computing device 250, including instructions stored in memory 264. Processor 252 may be implemented as a chipset of chips that include separate and multiple analog and digital processors. Processor 252 may provide, for example, for coordination of the other components of mobile computing device 250, such as control of user interfaces, applications run by mobile computing device 250, and wireless communication by mobile computing device 250.

Processor 252 may communicate with a user through control interface 258 and display interface 256 coupled to a display 254. Display 254 may be, for example, a TFT LCD (Thin-Film-Transistor Liquid Crystal Display) or an OLED (Organic Light Emitting Diode) display, or other appropriate display technology. Display interface 256 may comprise appropriate circuitry for driving display 254 to present graphical and other information to a user. Control interface 258 may receive commands from a user and convert them for submission to the processor 252. In addition, an external interface 262 may be provided to facilitate communication with processor 252, so as to enable near area communication of mobile computing device 250 with other devices. External interface 262 may provide, for example, for wired communication in some implementations, or for wireless communication in other implementations, and multiple interfaces may also be used.

Memory 264 stores information within mobile computing device 250. Memory 264 can be implemented as one or more of a computer-readable medium or media, a volatile memory unit or units, or a non-volatile memory unit or units. Expansion memory 274 may also be provided and connected to mobile computing device 250 through expansion interface 272, which may include, for example, a SIMM (Single In Line Memory Module) card interface. Such expansion memory 274 may provide extra storage space for device 250, or may also store applications or other information for mobile computing device 250. Specifically, expansion memory 274 may include instructions to carry out or supplement the processes described above, and may include secure information also. Thus, for example, expansion memory 274 may be provide as a security module for mobile computing device 250, and may be programmed with instructions that permit secure use of device 250. In addition, secure applications may be provided via the SIMM cards, along with additional information, such as placing identifying information on the SIMM card in a non-hackable manner.

Expansion memory 274 may include, for example, flash memory and/or NVRAM memory. In one implementation, a computer program product is tangibly embodied in an information carrier. The computer program product contains instructions that, when executed, perform one or more methods, such as those described above. The information carrier is a computer-or machine-readable medium, such as the memory 264, expansion memory 274, or memory on processor 252, that may be received, for example, over transceiver 268 or external interface 262.

Mobile computing device 250 may communicate wirelessly through communication interface 266, which may include digital signal processing circuitry where necessary. Communication interface 266 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 268. In addition, short-range communication may occur, such as using a Bluetooth, WiFi, or other such transceiver (not shown). In addition, GPS (Global Positioning System) receiver module 270 may provide additional navigation- and location-related wireless data to mobile computing device 250, which may be used as appropriate by applications running on mobile computing device 250.

Mobile computing device 250 may also communicate audibly using audio codec 260, which may receive spoken information from a user and convert it to usable digital information. Audio codec 260 may likewise generate audible sound for a user, such as through a speaker, e.g., in a handset of mobile computing device 250. Such sound may include sound from voice telephone calls, may include recorded sound, such as voice messages, music files, etc., and may also include sound generated by applications operating on mobile computing device 250.

Mobile computing device 250 may be implemented in a number of different forms, as shown in the figure. For example, it may be implemented as a cellular telephone 280. It may also be implemented as part of a smart phone 282, personal digital assistant, or other similar mobile device.

Various implementations of the systems and techniques described herein can be realized in digital electronic circuitry, integrated circuitry, specially designed ASICs (application specific integrated circuits), computer hardware, firmware, software, and/or combinations thereof. These various implementations can include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any apparatus and/or device, such as magnetic discs, optical disks, memory, Programmable Logic Devices ("PLDs"), etc., used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described herein can be implemented on a computer having a display device, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

The systems and techniques described herein can be implemented in a computing system that includes a back end component, such as a data server, or that includes a middleware component, such as an application server, or that includes a front end component, such as a client computer having a graphical user interface or a Web browser through which a user can interact with an implementation of the systems and techniques described here, or any combination of such back end, middleware, or front end components. The components of the system can be interconnected by any form or medium of digital data communication, such as a communication network. Examples of communication networks include a local area network ("LAN"), a wide area network ("WAN"), and the Internet.

Figure 3:
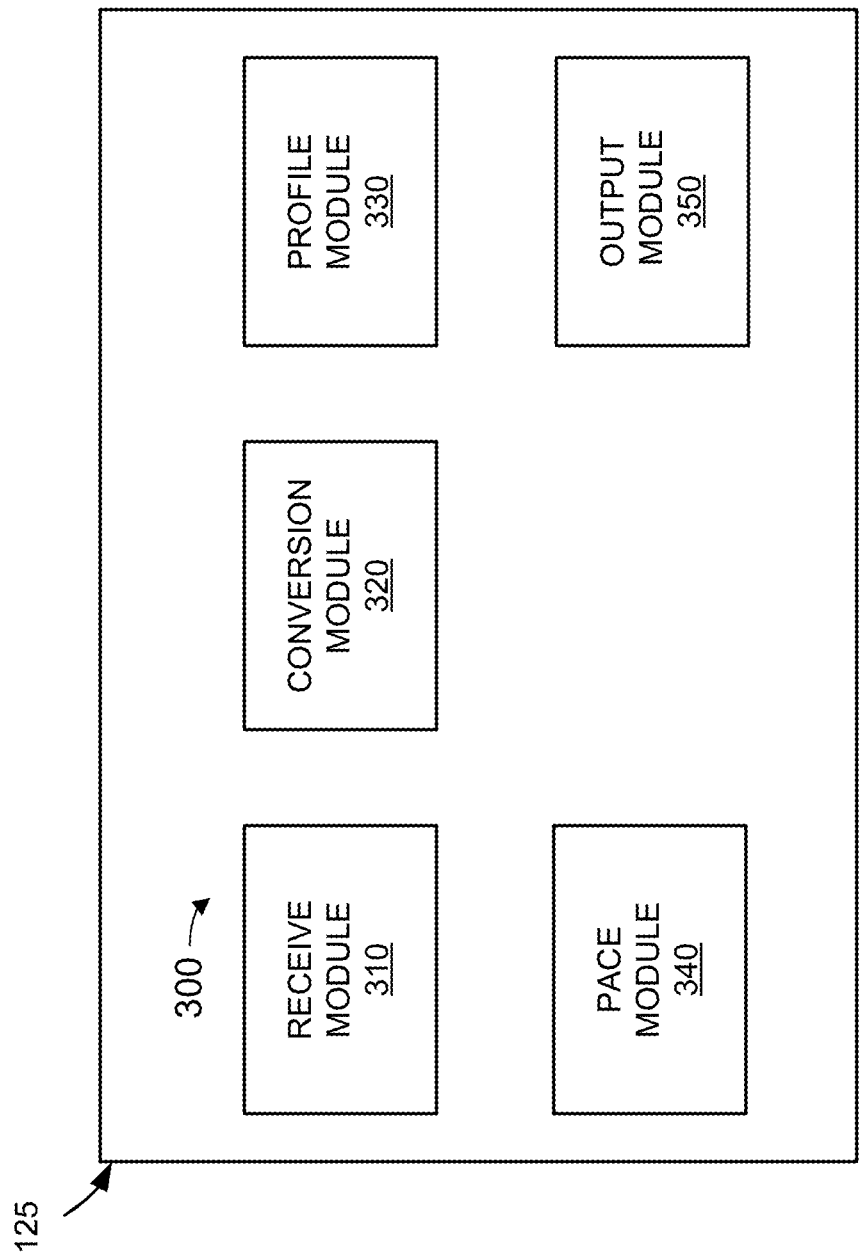
FIG. 3 is a diagram of example functional components associated with the voice processing system of FIG. 1.

FIG. 3 is a diagram of example functional components 300 associated with the voice processing system 125. Each of the functional components, shown in FIG. 3, may be implemented by one or more of the components described with regard to FIG. 2. As shown in FIG. 3, functional components 300 may include a collection of modules, such as a receive module 310, a conversion module 320, a profile module 330, a pace module 340, and an output module 350. The quantity of modules included within function components 300 is provided for explanatory purposes only. In other implementations, there may be fewer modules, additional modules, different modules, or differently arranged modules than that shown in functional components 300. Also, in some implementations, one or more of the modules, of functional components 300, may perform one or more functions described as being performed by another one or more modules of functional components 300.

Receive module 310 may receive a request, from client 110, and may process the request to identify a pace at which the request is spoken by a user of client 110. In an example implementation, receive module 310 may use speech recognition technology to recognize and/or process individual terms, words, phrases, sentences, etc., that are spoken by the user, in a variety of languages or dialects associated with the languages.

Receive module 310 may process the request to identify a pace at which the request is spoken by the user. For example, receive module 310 may identify an individual term, such as a word, a part of a word, a sound, etc., and/or a group of terms, such as phrases, sentences, etc., that are spoken by the user and included within the request. Receive module 310 may identify one or more individual terms and/or group of terms that match standard terms, such as "hello," "yes," "no," "please," "purchase," etc., and/or standard groups of terms, such as "my name is . . . ," "I don't know . . . ," "I would like . . . ," etc., that are stored within a memory associated with server 120. Receive module 310 may identify a quantity of terms that are spoken, by the user, during a time period and may identify a pace, associated with the request, based on the quantity of terms spoken within the time period, such as in words per second, words per minute, phrases per minute, etc. The time period may be measured from a start time that the user begins to utter a term or group of terms to an end time at which the user stops uttering the term or the group of terms.

Additionally, or alternatively, receive module 310 may communicate with conversion module 320 to identify a pace associated with the request based on converting the terms, associated with the request, to a text-based format.

Conversion module 320 may convert spoken terms to a textual version of the spoken terms and/or may convert textual terms to verbal terms (e.g., a voice response) that can be generated by output module 350. Conversion module 320 may, for example, convert the terms associated with the request to text at a particular pace (hereinafter referred to as a text pace) that is dependent on a pace at which the request is spoken by the user of client 110. In this example, the text pace may be based on a quantity of text-based characters generated during a time period, a quantity of text-based terms generated within the time period, a quantity of lines of text generated during the time period, etc. Thus, if a pace associated with the request increases, then the text pace, at which the request is converted to text, may also increase. Similarly, if the pace associated with the request decreases, then the text pace, at which the request is converted to text, may also decrease.

Conversion module 320 may also, or alternatively, convert a text-based response, to a voice response to be outputted by output module 350. The pace at which the text is converted to the voice response may be determined by pace module 340 and/or output module 350.

Profile module 330 may generate, control, and/or retrieve a speech profile associated with a user of client 110. Profile module 330 may, for example, obtain information, associated with the user from receive module 310, such as based on a request, and/or may obtain information associated with the user from storage 130, based on, for example, a registration operation performed with client 110. For example, profile module 330 may generate a speech profile, associated with the user, based on a language and/or a dialect that is spoken by the user. Additionally, or alternatively, profile module 330 may generate the speech profile based on an age associated with the user and/or a geographic location associated with the user. The geographic location may, for example, be based on a home address, a business address, location information associated with client 110, etc. In one example, profile module 330 may prompt server 120 to communicate with client 110 to identify a location associated with client 110. Profile module 330 may also, or alternatively, maintain a pace history, associated with the user, based on paces associated with previous requests received from client 110.

Profile module 330 may also, or alternatively, identify a normal pace associated with the user. The normal pace may correspond to paces spoken by users of other clients 110 when communicating with voice processing system 125. The normal pace may, for example, be based on an average pace, spoken by users, located within a same geographical area as the user, in a same age range as the user, that speak the same dialect as the user, that are of the same gender as the user, or the like.

Profile module 330 may also, or alternatively, process video content associated with the user of client 110 and/or biometric information associated with the user. The video content and/or biometric information may be obtained from a speech profile and/or obtained from a request. When processing the video content and/or biometric information, profile module 330 may identify an amount of movement associated with the user, a heart rate and/or a breathing rate associated with the user, facial features and/or expressions associated with the user, etc. Profile module 330 may use the video content and/or biometric information to identify a level of perceived urgency associated with the user.

Pace module 340 may identify a pace at which a voice response is to be provided. For example, pace module 340 may identify a response pace, associated with a voice response to be provided to client 110, based on a request pace associated with the request, as identified by voice module 310, and a normal pace, associated with the user of client 110, as identified by profile module 330. Pace module 340 may determine that the response pace corresponds to a slow response pace, that is less than a slow threshold, when the request pace is less than the normal pace associated with the user. Pace module 340 may determine that the response pace corresponds to a medium response pace or standard pace, that is not less than the slow threshold and is less than a fast threshold, when the request pace is approximately equal to the normal pace. Pace module 340 may determine that the response pace corresponds to a fast response pace, that is not less than the fast threshold, when the request pace is greater than the normal pace. The standard pace, the slow threshold, and/or the fast threshold may be predetermined by server 120 or specified by an operator of server 120. Additionally, or alternatively, the fast threshold may be greater than the slow threshold.

Pace module 340 may increase the response pace when a level of perceived urgency, associated with the user, is greater than a threshold and may decrease the response pace when the level of perceived urgency is less than the threshold.

Output module 350 may generate the voice response based on a request pace determined by pace module 340 and/or conversion module 320. Output module 350 may cause server 120 to transmit the voice response, to client 110, in a manner that causes client 110 to output the voice response at a response pace that is based on the request pace. Additionally, or alternatively, pace module 340 may generate and/or output, to client 110, the voice response.

Figure 4:
FIG. 4 is a diagram of an example data structure that stores information associated with a speech profile.

FIG. 4 is a diagram of an example data structure 400 that stores information associated with a speech profile. Data structure 400 may be stored in storage 130. Data structure 400 may include a collection of fields, such as a client identifier (ID) field 405, a user information field 410, a language field 415, a gender field 420, a location field 425, an age field 430, a user pace field 435, and a normal pace field 440. The quantity of fields included within data structure 400 is provided for explanatory purposes. In other implementations, there may be fewer fields, additional fields, different fields, or differently arranged fields than that shown in data structure 400.

Client identifier (ID) field 405 may store information associated with a particular client 110 that communicates, one or more requests, to voice processing system 125 of server 120. The information, associated with the particular client 110, may include a device identifier, such as a mobile directory number (MDN), a landline directory number (LDN), a telephone number, etc. The information, associated with the particular client 110, may also, or alternatively, include a network address, such as an Internet protocol (IP) address, a media access control (MAC) address, etc. User information field 410 may store information associated with a user of the particular client 110, such as a username, password, personal identification number (PIN), etc.

Language field 415 may identify a language spoken by the user, such as English, Spanish, etc. Additionally, or alternatively, language field 415 may identify a dialect, associated with the language spoken by the user. Gender field 420 may store information that identifies a gender associated with the user. Location field 425 may identify a geographic location associated with the user, such as physical address, such as a home address, a business address, etc., or a geographic area in which the user and/or client 110 is located, such as a town, zip code, a county, a state, a country, etc. Additionally, or alternatively, location field 425 may identify a location associated with the particular client 110, such as a location based on global positioning satellite (GPS) coordinates, a cell identifier, etc. Age field 430 may identify an age associated with the user and/or an age range, such as less than 18 years old, between 18 and 24 years old, between 24 to 32 years, etc., associated with the user.

User pace field 435 may identify a request pace for speech, associated with the user, based on one or more requests received, during a prior time period, from a first time instance to a second time instance. The pace of speech may, for example, be an average of paces of speech identified with respect to the requests. Additionally, or alternatively, user pace field 435 may store biometric information, associated with the user, obtained from the requests during the prior time period. The biometric information may, for example, include video content associated with the user, that is based on, for example, facial recognition technology that identifies facial expressions, facial features and locations, eye movement, etc. and/or other biometric information, such as a finger print, a heart rate, a breathing rate, etc., associated with the user. Normal pace field 440 may represent another pace of speech, associated with the user, based on paces of speech associated with users, of other clients 110, within a particular distance of the location identified in location field 425, that speak a language or dialect identified in language field 415, of a gender identified in gender field 420, and/or within a range of ages identified within age field 430.

Figure 5A:
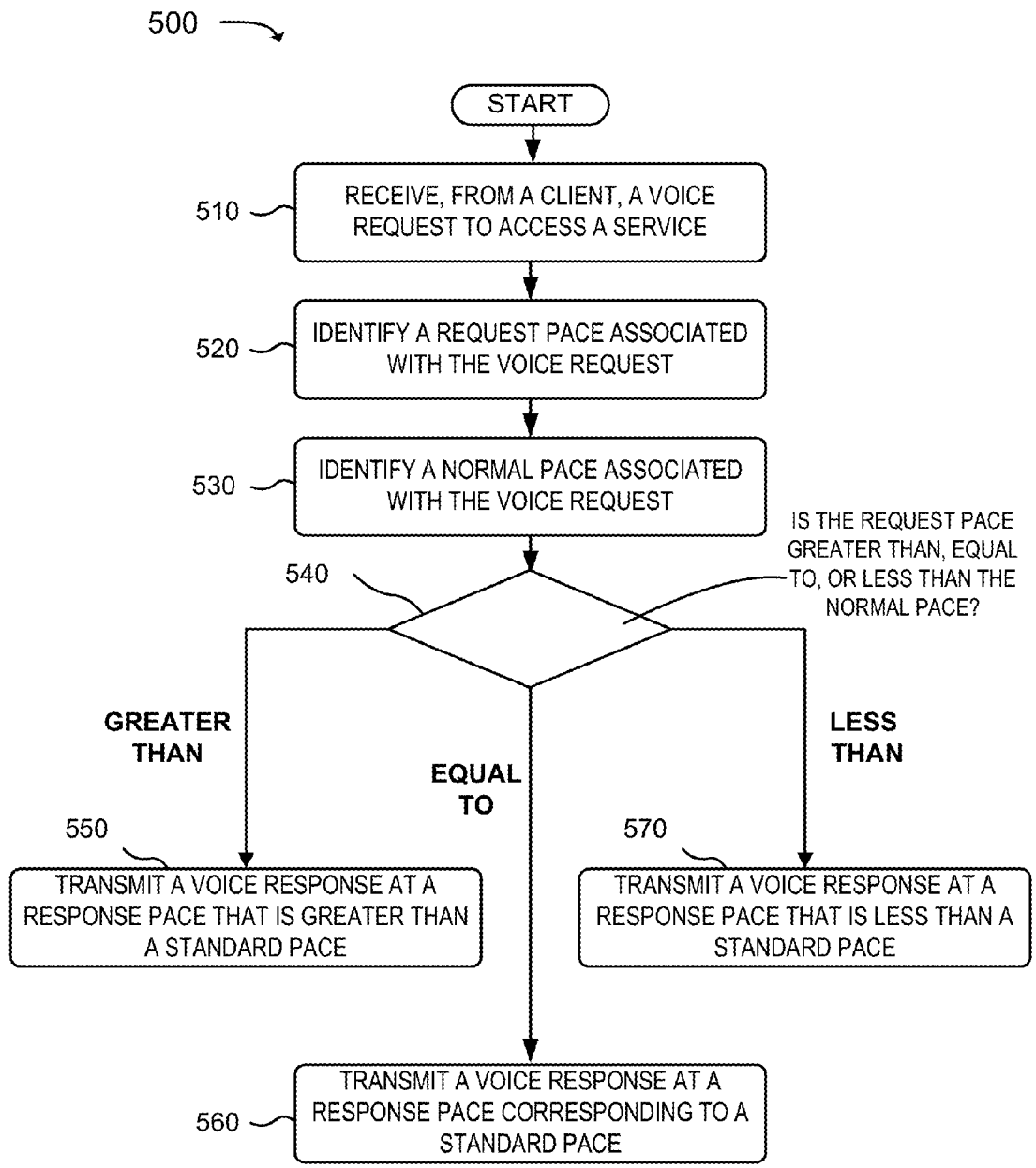
FIGS. 5A and 5B are flowcharts of example processes for processing a request.

FIG. 5A is a flowchart of an example process 500 for processing a request. In an example implementation, process 500 may be performed by server 120. In another example implementation, process 500 may be performed by a device, or collection of devices, separate from or in combination with, server 120.

As shown in FIG. 5A, process 500 may include receiving, from a client, a request to access a service (block 510) and identifying a request pace associated with the request (block 520). For example, client 110 may communicate with server 120 to access a service. In one example, client 110 may communicate with server 120 by establishing a connection with server 120. Server 120 may, as a result of the communication, instruct voice processing system 125 to prompt the user, of client 110, to identify a service that the user desires to access. When prompting the user, voice processing system 125 may, for example, instruct the user to identify the service by providing a request that identifies the service.

Voice processing system 125 may receive the request and may identify a request pace associated with the request. For example, voice processing system 125 may identify a quantity of terms, such as words, parts of words, etc., associated with the request and may determine a time period during which the request was received. Based on the quantity of terms included within the request and the time period, voice processing system 125 may identify a request pace, measured as, for example, words per second, words per minute, etc., associated with the request. Additionally, or alternatively, voice processing system 125 may identify one or more terms included within the request and may identify a respective time period during which each of the terms were spoken. Voice processing system 125 may identify the request pace based the respective time period for each of the terms. The respective time period may, for example, be based on a sum of the respective time periods divided by a quantity associated with the one or more terms, etc. Voice processing system 125 may save the request pace in a data structure, such as in data structure 400 of FIG. 4.

Additionally, or alternatively, voice processing system 125 may convert the terms, associated with the request, to a text-based format. Voice processing system 125 may identify the text pace based on a quantity of the terms that were converted to the text-based format and a time period associated with converting the quantity of terms to the text-based format. For example, the text pace may, in a manner similar to that described above with respect to FIG. 3, be based on a quantity of text-based terms, text-based characters, lines of text, etc. that are generated, by voice processing system 125, during the time period. In this example, the request pace may correspond to the text pace.

As also shown in FIG. 5A, process 500 may include identifying a normal pace associated with the request (block 530). Voice processing system 125 may, for example, retrieve a speech profile associated with client 110 and/or a user of client 110. Voice processing system 125 may identify a normal pace, associated with the request, based on the speech profile in a manner similar to that described below with respect to FIG. 6.

If the request pace is greater than the normal pace (block 540—GREATER THAN), then process 500 may include transmitting a voice response at a response pace that is greater than a standard pace (block 550). For example, voice processing system 125 may compare the request pace to the normal pace to determine whether the request pace is greater than the normal pace, is approximately equal to the normal pace, or is less than the normal pace. Based on a determination that the request pace is greater than the normal pace, voice processing system 125 may generate a voice response that is to be transmitted, to client 110 and by server 120, at a response pace that is greater than a standard pace. The voice response may allow the user, of client 110 to access the service identified in the request. The request pace being greater than the normal pace may represent a first level of perceived urgency, associated with the user, that is greater than a threshold. Transmitting the voice response at the response pace, that is greater than the standard pace, may correspond to a second level of perceived urgency that matches the first level of perceived urgency, which may improve the user experience.

If the request pace is equal to the normal pace (block 540—EQUAL TO), then process 500 may include transmitting a voice response at a response pace that corresponds to a standard pace (block 560). For example, voice processing system 125 may determine, based on the comparison between the request pace and the normal pace, that the request pace is approximately equal to the normal pace. Based on the determination that the request pace is approximately equal to the normal pace, voice processing system 125 may generate the voice response, to be transmitted by server 120 and to client 110, at a response pace that is approximately equal to the standard pace. The request pace being approximately equal to the normal pace may represent a first level of perceived urgency, associated with the user, that is not greater than the first threshold and is greater than a second threshold, where the second threshold is less than the first threshold. Transmitting the voice response at the response pace may correspond to a second level of perceived urgency that matches the first level of perceived urgency, which may improve the user experience.

If the request pace is less than the normal pace (block 540—LESS THAN), then process 500 may include transmitting a voice response at a response pace that is less than a standard pace (block 570). For example, voice processing system 125 may determine, based on the comparison between the request pace and the normal pace, that the request pace is less than the normal pace. Based on the determination that the request pace is less than the normal pace, voice processing system 125 may generate the voice response, to be transmitted by server 120 and to client 110, at a response pace that is less than the standard pace. The request pace being less than to the normal pace may represent a first level of perceived urgency, associated with the user, that is not greater than the second threshold. Transmitting the voice response at the response pace may correspond to a second level of perceived urgency that matches the first level of perceived urgency, which may improve the user experience.

Figure 5B:
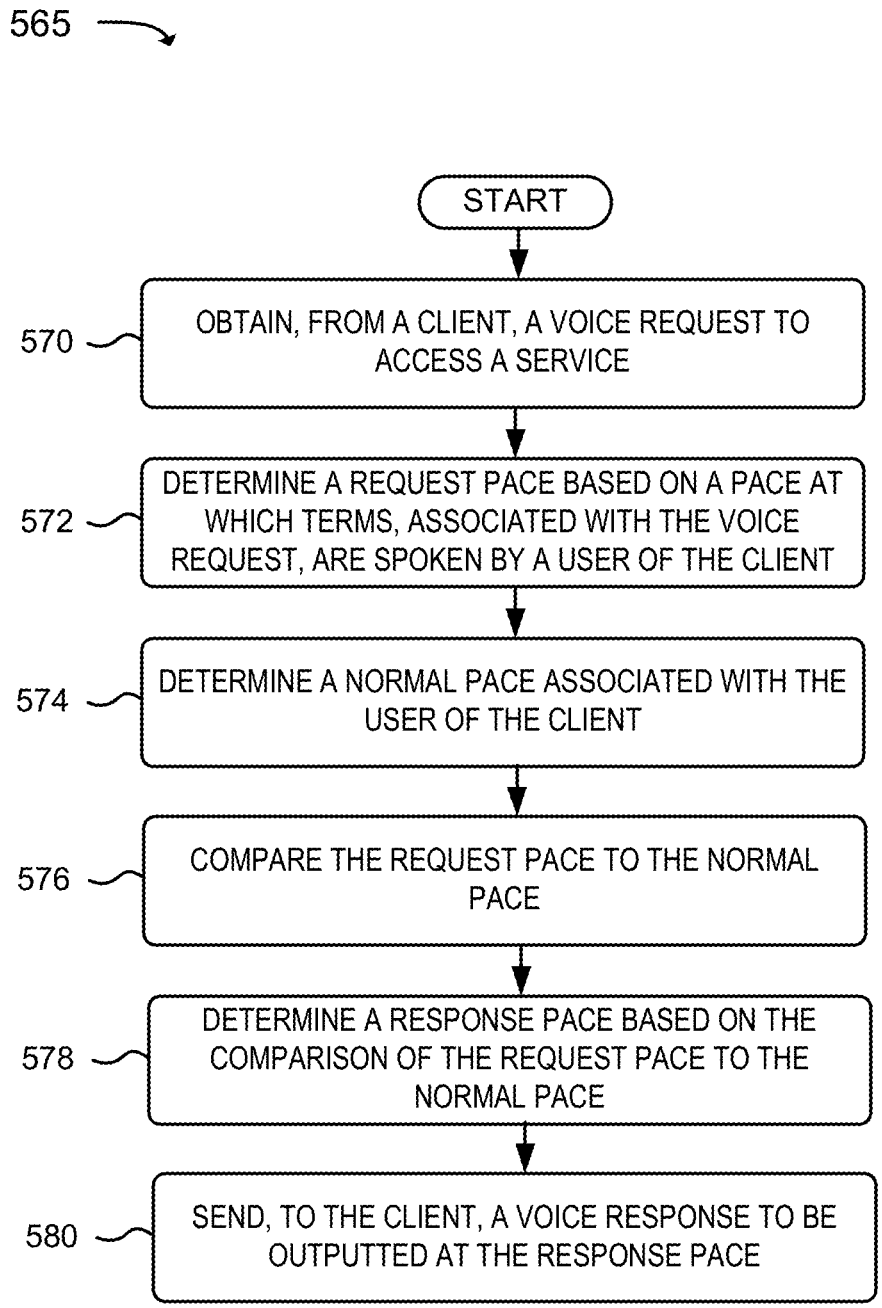

FIG. 5B is a flowchart of an example process 565 for processing a request. In an example implementation, process 565 may be performed by server 120. In another example implementation, process 565 may be performed by a device, or collection of devices, separate from or in combination with, server 120.

As shown in FIG. 5B, process 565 may include obtaining, from a client, a voice request to access a service (block 570) and determining a request pace based on a pace at which terms, associated with the voice request, are spoken by a user of the client (block 572). For example, client 110 may communicate with server 120 to access a service. In one example, client 110 may communicate with server 120 by establishing a connection with server 120. Server 120 may, as a result of the communication, obtain a request, from client 110, to access a service. The request may be spoken by a user of client 110 and client 110 may transmit one or more terms, associated with the request, to server 120. Server 120 may receive the request and may instruct voice processing system 125 to determine a request pace associated with the request.

Voice processing system 125 may, in response to the instruction and in a manner similar to that described above with respect to block 520 of FIG. 5A, determine a request pace, associated with the request, based on a quantity of terms included in the request and/or a time period during which the terms were spoken. Additionally, or alternatively, voice processing system 125 may determine a respective time period during which each of the terms were spoken. Voice processing system 125 may identify the request pace based the respective time period for each of the terms. The respective time period may, for example, be based on a sum of the respective time periods divided by a quantity associated with the one or more terms, etc. Voice processing system 125 may save the request pace in a data structure, such as in data structure 400 of FIG. 4.

Additionally, or alternatively, voice processing system 125 may, in a manner similar to that described above with respect to block 520 of FIG. 5A, convert the terms, associated with the request, to a text-based format. Voice processing system 125 may identify the text pace based on a quantity of the terms that were converted to the text-based format and a time period associated with converting the quantity of terms to the text-based format.

As also shown in FIG. 5B, process 565 may include determining a normal pace associated with the user of the client (block 574). Voice processing system 125 may, for example, retrieve a speech profile associated with client 110 and/or the user of client 110. Voice processing system 125 may identify a normal pace, associated with the request, based on the speech profile in a manner similar to that described below with respect to FIG. 6.

As further shown in FIG. 5B, process 565 may include comparing the request pace to the normal pace (block 576), determining a response pace based on the comparison of the request pace to the normal pace (block 578), and sending, to the client, a voice response to be outputted at the response pace (block 580). For example, voice processing system 125 may, in a manner similar to that described above with respect to blocks 540 and 550 of FIG. 5A, compare the request pace to the normal pace to determine whether the request pace is greater than the normal pace, is approximately equal to the normal pace, or is less than the normal pace. Based on a determination that the request pace is greater than the normal pace, voice processing system 125 may generate a voice response associated with a response pace that is greater than a standard pace. Server 120 may transmit, to client 110, the voice response that allows client 110 to output the voice response at the response pace that is greater than the standard pace. The voice response may allow the user, of client 110, to access the service identified in the request. The request pace, being greater than the normal pace, may represent a first level of perceived urgency, associated with the user, that is greater than a first threshold. Thus, the voice response, associated with the response pace that is greater than the standard pace, may correspond to a second level of perceived urgency that matches the first level of perceived urgency, which may improve the user experience.

In another example, voice processing system 125 may, in a manner similar to that described above with respect to blocks 540 and 560 of FIG. 5A, determine, based on the comparison between the request pace and the normal pace, that the request pace is approximately equal to the normal pace. Based on the determination that the request pace is approximately equal to the normal pace, voice processing system 125 may generate a voice response associated with a response pace that is approximately equal to the standard pace. Server 120 may transmit, to client 110, the voice response that allows client 110 to output the voice response at a response pace that is approximately equal to the standard pace. The request pace, being approximately equal to the normal pace, may represent a first level of perceived urgency, associated with the user, that is not greater than the first threshold and is greater than a second threshold, where the second threshold is less than the first threshold. Thus, the voice response, associated with the response pace that is approximately equal to the standard pace, may correspond to a second level of perceived urgency that matches the first level of perceived urgency, which may improve the user experience.

For example, voice processing system 125 may, in a manner similar to that described above with respect to blocks 540 and 570 of FIG. 5A, determine, based on the comparison between the request pace and the normal pace, that the request pace is less than the normal pace. Based on the determination that the request pace is less than the normal pace, voice processing system 125 may generate a voice response associated with a response pace that is less than the standard pace. Server 120 may transmit, to client 110, the voice response that allows client 110 to output the voice response at the response pace that is less than the standard pace. The request pace, being less than the normal pace, may represent a first level of perceived urgency, associated with the user, that is not greater than the second threshold. Thus, the voice response, associated with the response pace that is less than the standard pace, may correspond to a second level of perceived urgency that matches the first level of perceived urgency, which may improve the user experience.

Figure 6:
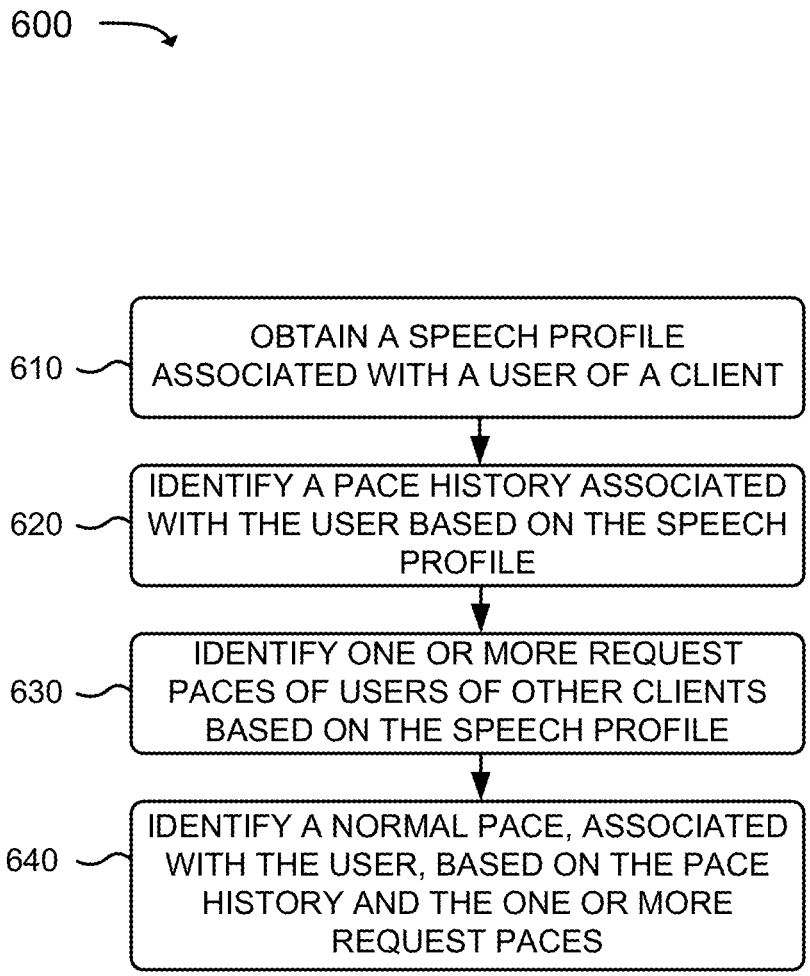
FIG. 6 is a flowchart of an example process for identifying a normal speaking pace associated with a user of a client.

FIG. 6 is a flowchart of an example process 600 for identifying a normal speaking pace associated with a user of client 110. Process 600 may correspond to block 530 of FIG. 5A and/or block 574 of FIG. 5B. In an example implementation, process 600 may be performed by server 120. In another example implementation, process 600 may be performed by a device, or collection of devices, separate from or in combination with, server 120.

As shown in FIG. 6, process 600 may include obtaining a speech profile associated with a user of the client (block 610) and obtain, from the speech profile, a speech history associated with the user (block 620). For example, voice processing system 125, associated with server 120, may retrieve, from storage 130, a speech profile associated with a user of client 110 from which a request was received. Voice processing system 125 may obtain, from the speech profile, a speech history, associated with the user, that identifies one or more paces associated with previous requests, received from client 110, during a prior period of time. Voice processing system 125 may determine a user pace (UP) based on the one or more paces associated with the previous requests, such as an average of the paces associated with the previous requests.

As also shown in FIG. 6, process 600 may include identifying one or more paces associated with users of other clients based on the speech profile (block 630). For example, voice processing system 125 may retrieve, from storage 130, paces associated with requests received from other users of clients 110. Voice processing system 125 may identify a general pace (P) based on, for example, an average, mean, etc., of the paces associated with the requests received from the other users.

Additionally or alternatively, voice processing system 125 may identify a language and/or dialect spoken by the user of client 110 based on the speech profile. Voice processing system 125 may retrieve, from storage 130, paces associated with requests, received from users of other clients 110, that speak the same language or dialect. Voice processing system 125 may identify a language pace, (LP) based on, for example, an average, mean, etc. of the paces associated with the requests received from the users that speak the identified language or dialect.

Additionally, or alternatively, voice processing system 125 may identify a gender associated with the user of client 110 based on the speech profile. Voice processing system 125 may retrieve, from storage 130, paces associated with requests received from users, of other clients 110, that are of the same gender as the user of client 110. Voice processing system 125 may identify a gender pace (GP) based on, for example, an average, mean, etc., the paces associated with the requests received from the users that are of the same gender as the user.

Additionally, or alternatively, voice processing system 125 may identify a location and/or geographical area associated with client 110 based on the speech profile. Voice processing system 125 may retrieve, from storage 130, paces associated with requests received from users, of other clients 110, that are located within the geographical area and/or within a distance of the identified location. Voice processing system 125 may identify a geographic location pace (GLP) based on, for example, an average, mean, etc., of the paces associated with the requests received from other clients 110, and/or users of other clients 110, that are located within the geographical area and/or within the distance from the location.

Additionally, or alternatively, voice processing system 125 may identify an age and/or range of ages associated with the user of client 110 based on the speech profile. Voice processing system 125 may retrieve, from storage 130, paces associated with requests received from users, of other clients 110, that are of the same age and/or within the same range of ages as the user of client 110. Voice processing system 125 may identify an age pace (AP), based on, for example, an average, mean, etc., the paces associated with the requests received from users that are of the same age and/or range of ages as the user.

As further shown in FIG. 6, process 600 may include identifying a normal pace, associated with the user, based on the pace history and the one or more request paces (block 640). For example, voice processing system 125 may determine a normal pace, associated with the user of client 110 based on one or more of the general pace (P), the user pace (UP), the language pace (LP), the gender pace (GP), the geographic location pace (GLP), and/or the age pace (AP). In one example, the normal pace may be based on an average of the general pace, the user pace, the language pace, the gender pace, the geographic location pace, and/or the age pace, such as where the normal pace $(NP) \cong (P+UP+LP+GP+GLP+AP)/6$.

Additionally, or alternatively, voice processing system 125 may determine the normal pace based on a weighted average of the general pace, the user pace, the language pace, the gender pace, the geographic location pace, and/or the age pace. For example, voice processing system 125 may retrieve predetermined and/or operator-specified weighting factors, such as W1, W2, W3, W4, W5, and W6, from a memory associated with server 120. For example, each weighting factor may fall within a particular range, such as between zero and one, and where the sum of the weighting factors may be less than a threshold, such as where $W1+W2+W3+W4+W5+W6 \cong 1$.

Each of the general pace, the user pace, the language pace, the gender pace, the geographic location pace, and/or the age pace may be assigned a different weighting factor to control a manner in which the normal pace is determined, such as where $NP \cong W1*P+W2*UP+W3*LP+W4*GP+W5*GLP+W6*AP$. The weighting factors may be predetermined by server 120 and/or may be specified, within voice processing system 125, by an operator of server 120. For example, each of the general pace, the user pace, the language pace, the gender pace, the geographic location pace, and/or the age pace may contribute equally to the normal pace when each of the weighting factors are equal, such as where $NP \cong 0.167*P+0.167*UP+0.167*LP+0.167*GP+0.167*GLP+0.167*AP$. In another example, the normal pace may be determined based on different contributions of the user pace, the language pace, the gender pace, the geographic location pace, and/or the age pace, such as where $NP \cong 0.0*P+0.5*UP+0.2*LP+0.1*GP+0.1*GLP+0.2*AP)$.

In this example, zero percent (0.0) of the normal pace may be based on the general pace, fifty percent (0.5) on the user pace, twenty percent (0.2) on the language pace, and a respective ten-percent (0.1) on each of the gender pace, the geographic location pace, and the age pace.

Figure 7:
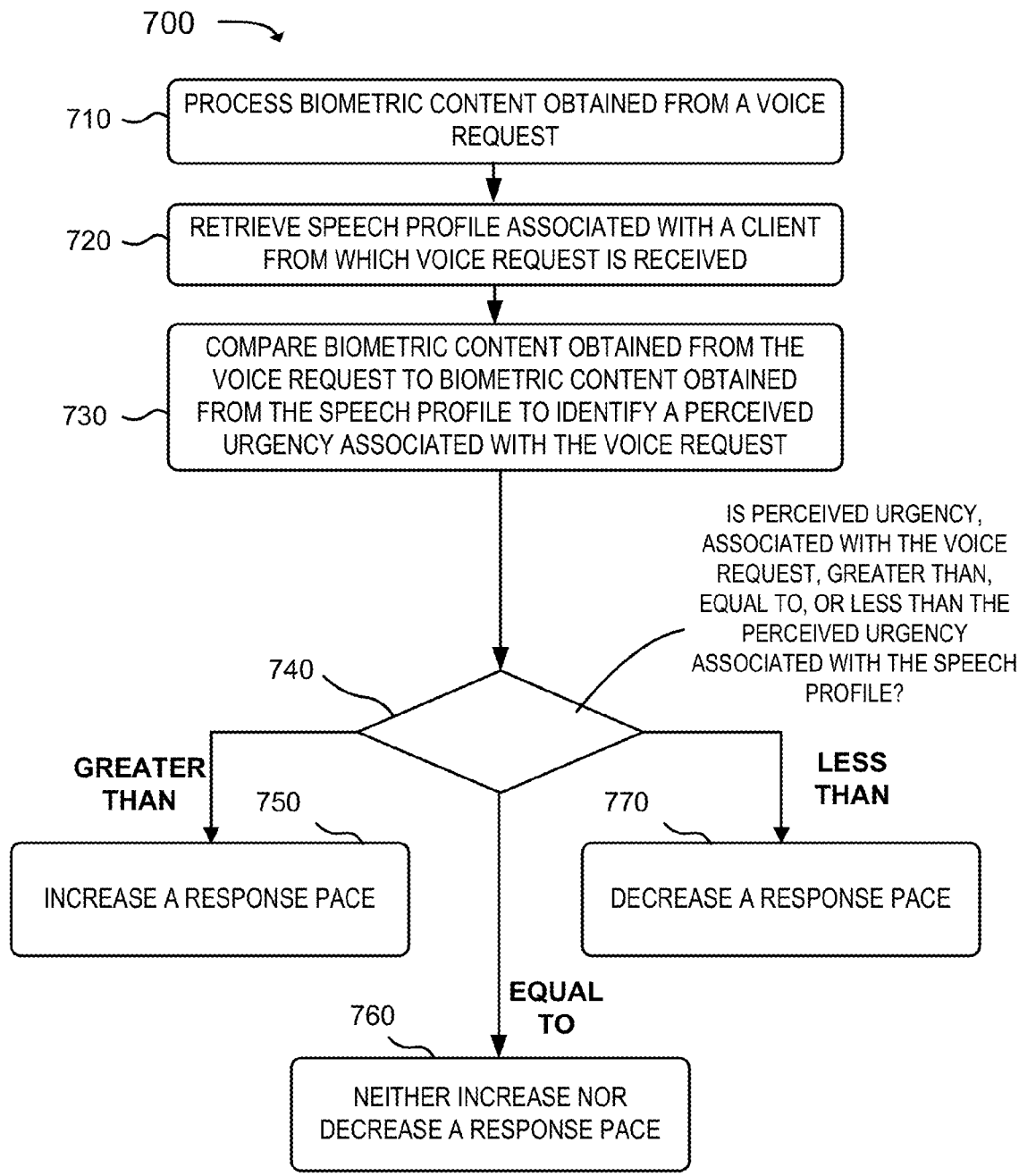
FIG. 7 is a flowchart of an example process for processing a request.

FIG. 7 is a flowchart of an example process 700 for processing a request. In an example implementation, process 700 may be performed by server 120. In another example implementation, process 700 may be performed by a device, or collection of devices, separate from or in combination with, server 120.

As shown in FIG. 7, process 700 may include processing biometric content obtained from a request (block 710) and retrieving a speech profile associated with a client from which the request was received (block 720). For example, server 120 may receive, from client 110, a request that includes biometric content associated with a user of client 110. The biometric content may include one or more images and/or video content, associated with the user, that identifies facial features associated with the user and/or other biometric content, associated with the user, such as a heart rate, a breathing rate, etc. Voice processing system 125 may obtain, from the request, the biometric content and may process the biometric content. For example, voice processing system 125 may, using facial recognition technology and/or some other technology, process the video content and/or images to identify head and/or facial features, such as movement, size, color, shape, eye position, eye color, eye movement, expression, etc., and/or other features associated with the user, such as hand gestures, hand movement, etc. Additionally, or alternatively, voice processing system 125 may process the biometric content to identify a heart rate, a breathing rate, etc. associated the user provided that the user chooses to allow such biometric information to be monitored and/or provided via the request. Voice processing system 125 may retrieve, from storage 130, a speech profile associated with the user. The speech profile may include biometric information associated with one or more previous requests, received from client 110, during a prior time period, before receiving the request.

As also shown in FIG. 7, process 700 may include comparing biometric content, obtained from the request, to biometric content obtained from the speech profile to identify a perceived urgency associated with the request (block 730). For example, voice processing system 125 may compare the processed biometric content, obtained from the request, to biometric content, associated with the previous requests, obtained from the speech profile. For example, voice processing system 125 may compare first head and/or facial features, associated with the user and obtained from the request, to second head and/or facial features, associated with the user, obtained from the speech profile.

In one example, voice processing system 125 may compare a first rate of eye and/or head movement, associated with the first head and/or facial features, to a second rate of eye and/or head movement associated with the second head and/or facial features. Additionally, or alternatively, voice processing system 125 may compare first facial expressions, such as a quantity and/or duration associated with smiles, frowns, grimaces, etc., associated with the first head and/or facial features with second facial expressions associated with the second head and/or facial features. Additionally, or alternatively, voice processing system 125 may compare other biometric information, such as a first heart rate, breathing rate, etc., associated with the voice response to a second heart rate, breathing rate, etc. based on the speech profile. Voice processing system 125 may identify a level of perceived urgency of the user, associated with the request, relative to a level of perceived urgency of the user, associated with the speech profile, based on the comparison of the biometric information obtained from the request, to the biometric information derived from the speech profile.

If the perceived urgency, associated with the request is greater than a perceived urgency associated with the speech profile (block 740—GREATER THAN), then process 700 may include increasing a response pace (block 750). For example, voice processing system 125 may identify, based on the comparison of the first head and/or facial features to the second head and/or facial features, that the first rate of eye and/or head movement, associated with the request, is greater than a second rate of eye and/or head movement, based on the speech profile. Based on the identification that the first rate of eye and/or head movement is greater than the second rate of eye and/or head movement, voice processing system 125 may determine that a level of perceived urgency, associated with the request, is greater than a level of perceived urgency associated with the speech profile.

Also, or alternatively, voice processing system 125 may identify that the first facial expressions correspond to a first quantity and/or duration of negative facial expressions, such as frowns, grimaces, etc., that is greater than a second quantity and/or duration of negative facial expressions associated with the second facial expressions. Based on the identification that the first quantity and/or duration of negative facial expressions is greater than the second quantity and/or duration of negative facial expressions, voice processing system 125 may determine that a level of perceived urgency of the user, associated with the request, is greater than a quantity of perceived urgency associated with the speech profile.

Also, or alternatively, voice processing system 125 may identify that the first heart rate and/or breathing rate of the user, associated with the request, is greater than a second heart rate and/or breathing rate of the user, respectively, obtained from the speech profile. Based on the identification that the first heart rate and/or breathing rate is greater than the second heart rate and/or breathing rate, respectively, voice processing system 125 may determine that a level of perceived urgency, associated with the request, is greater than a level of perceived urgency associated with the speech profile.

Voice processing system 125 may increase a pace, associated with a voice response, based on the determination that the level of perceived urgency, associated with the request, is greater than the level of perceived urgency associated with the speech profile. For example, voice processing system 125 may, in a manner similar to that described above with respect to block 570 of FIG. 5A, increase a response pace that is less than the standard pace, e.g., a slow pace, to a pace that is approximately equal to the standard pace e.g., a medium pace that is greater than the slow pace. In another example, voice processing system 125 may, in a manner similar to that described above with respect to block 560 of FIG. 5A, increase a response pace that corresponds to the standard pace, to a pace that is greater than the standard pace, e.g., a fast pace that is greater than a medium pace. In yet another example, voice processing system 125 may, in a manner similar to that described above with respect to block 550 of FIG. 5A, increase a response pace, that is greater than the standard pace by a particular amount, to a pace that is greater than the standard pace by an amount that is greater than the particular amount.

If the perceived urgency, associated with the request is equal to the perceived urgency associated with the speech profile (block 740—EQUAL TO), then process 700 may preclude increasing or decreasing the response pace (block 760). For example, voice processing system 125 may identify that the first rate of eye and/or head movement is approximately equal to the second rate of eye and/or head movement, respectively. Based on the identification that the first rate of eye and/or head movement is approximately equal to the second rate of eye and/or head movement, respectively, voice processing system 125 may determine that a level of perceived urgency, associated with the request, is approximately equal to the second level of perceived urgency associated with the speech profile.

Also, or alternatively, voice processing system 125 may identify that the first facial expressions correspond to a first quantity and/or duration of negative facial expressions that is approximately equal to the second quantity and/or duration of negative facial expressions. Based on the identification that the first quantity and/or duration of negative facial expressions is approximately equal to the second quantity and/or duration of negative facial expressions, voice processing system 125 may determine that the level of perceived urgency of the user, associated with the request, is approximately equal to the level of perceived urgency associated with the speech profile.

Also, or alternatively, voice processing system 125 may identify that the first heart rate and/or breathing rate of the user is approximately equal to a second heart rate and/or breathing rate of the user, respectively. Based on the identification that the first heart rate and/or breathing rate is approximately equal to the second heart rate and/or breathing rate, respectively, voice processing system 125 may determine that a level of perceived urgency, associated with the request, is approximately equal to the second level of perceived urgency associated with the speech profile.

Voice processing system 125 may neither increase nor decrease a pace, associated with a voice response, based on the determination that the level of perceived urgency, associated with the request, is approximately equal to the level of perceived urgency associated with the speech profile. For example, voice processing system 125 may, in a manner similar to that described above with respect to blocks 550-570 of FIG. 5A, neither increase nor decrease a response pace, at which a voice response is to be transmitted.

If the perceived urgency, associated with the request is less than the perceived urgency associated with the speech profile (block 740—LESS THAN), then process 700 may include decreasing a response pace (block 770). For example, voice processing system 125 may identify that the first rate of eye and/or head movement is less than the second rate of eye and/or head movement, respectively. Based on the identification that the first rate of eye and/or head movement is less than the second rate of eye and/or head movement, respectively, voice processing system 125 may determine that a level of perceived urgency, associated with the request, is less than the second level of perceived urgency associated with the speech profile.

Also, or alternatively, voice processing system 125 may identify that the first facial expressions correspond to a first quantity and/or duration of negative facial expressions that is less than the second quantity and/or duration of negative facial expressions. Based on the identification that the first quantity and/or duration of negative facial expressions is less than the second quantity and/or duration of negative facial expressions, voice processing system 125 may determine that the level of perceived urgency of the user, associated with the request, is less than the level of perceived urgency associated with the speech profile.

Also, or alternatively, voice processing system 125 may identify that the first heart rate and/or breathing rate of the user is less than a second heart rate and/or breathing rate of the user, respectively. Based on the identification that the first heart rate and/or breathing rate is less than the second heart rate and/or breathing rate, respectively, voice processing system 125 may determine that a level of perceived urgency, associated with the request, is less than a second level of perceived urgency associated with the speech profile.

Voice processing system 125 may decrease a pace, associated with a voice response, based on the determination that the level of perceived urgency, associated with the request, is less than the level of perceived urgency associated with the speech profile. For example, voice processing system 125 may, in a manner similar to that described above with respect to blocks 550-570 of FIG. 5A, decrease a response pace (e.g., from a fast pace to a medium pace, from a medium pace to a slow pace, etc.), at which a voice response is to be transmitted.

A system and/or method may include a voice processing system to receive a request from a client, determine a request pace associated with the request, and provide a voice response at a response pace that is based on the request pace. The voice processing system may, for example, identify a normal pace, associated with a user that provided the request via the client device. The normal pace may be based on paces, associated with requests, that are spoken by users of other clients. The users of the other clients may be of a same gender, range of age, geographic location, language and/or dialect, etc., as the user.

The voice processing system may compare the request pace to the normal pace to identify whether the voice response is to be transmitted, to the client, at a response pace that is less than the normal pace, approximately equal to the normal pace, or greater than the normal pace. The system and/or method may allow the voice processing system to use biometric information, associated with the user, to determine whether to increase the response pace, decrease the response pace, or permit the response pace to be transmitted without being increased or decreased. Providing the voice response at the response pace that is based on the request pace, relative to the normal pace, may improve a user experience when interacting with the voice processing system.

The foregoing description provides illustration and description, but is not intended to be exhaustive or to limit the implementations to the precise form disclosed. Modifications and variations are possible in light of the above teachings or may be acquired from practice of the implementations.

While series of blocks have been described with regard to FIGS. 5-7, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and/or methods is not limiting of the implementations. Thus, the operation and behavior of the systems and methods were described without reference to the specific software code—it being understood that software and control hardware can be designed to implement the systems and/or methods based on the description herein.

Further, certain portions, described above, may be implemented as a component or logic that performs one or more functions. A component or logic, as used herein, may include hardware, such as a processor, an ASIC, or a field-programmable gate array (FPGA), or a combination of hardware and software, such as a processor executing software.

It should be emphasized that the term "comprises/comprising," when used in this specification, is taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by one or more server devices associated with a voice processing system, the method comprising:
    obtaining, by at least one of the one or more server devices and from a client device, a first voice request to access the voice processing system that processes voice communications received from client devices;
    determining, by at least one of the one or more server devices and based on the first voice request, a first pace at which terms, associated with the first voice request, are spoken by a user of the client device;

determining, by at least one of the one or more server devices, a second pace, where the second pace is based on a weighted average of a user pace of terms spoken, by the user when accessing the voice processing system, prior to the first voice request being received, and another pace of terms spoken by users of other client devices, other than the client device, when accessing the voice processing system, wherein a first weight assigned to the user pace is different than a second weight assigned to the another pace;

comparing, by at least one of the one or more server devices, the first pace to the second pace;

determining, by at least one of the one or more server devices, a third pace based on the comparison of the first pace to the second pace; and sending, to the client device, a voice response to be outputted at the third pace.

2. The method of claim 1, where the third pace corresponds to:

a faster pace than a medium pace when the first pace is greater than the second pace, the medium pace when the first pace is approximately equal to the second pace, and a slower pace than the medium pace when the first pace is less than the second pace, where the faster pace, the medium pace, and the slower pace are different.

3. The method of claim 2, where the faster pace corresponds to a high-level of perceived urgency associated with the user, where the medium pace corresponds to a medium-level of perceived urgency associated with the user, where the medium-level of perceived urgency is less urgent than the high-level of perceived urgency, and where the slower pace corresponds to a low-level of perceived urgency associated with the user, where the low-level of perceived urgency is less urgent than the medium-level of perceived urgency.

4. The method of claim 1, where the first voice request includes first video content of the user, and where the method further includes;

comparing the first video content to second video content, that was received prior to the first video content, where the second video content corresponds to a first level of perceived urgency associated with the user;

identifying a second level of perceived urgency, associated with the user and relative to the first level of perceived urgency, based on the comparison of the first video content to the second video content; and sending, to the client device, a voice response to be outputted at the third pace based on the first level of perceived urgency and the second level of perceived urgency.

5. The method of claim 1, where determining the first pace further includes:

identifying a quantity of terms within a portion of the first voice request;

identifying a time period associated with the portion; and identifying the first pace based on the quantity of terms and the identified time period.

6. The method of claim 1, where determining the first pace further includes:

detecting one or more terms associated with the first voice request; and identifying the first pace based on a respective period of time for the user to speak each of the one or more terms.

7. The method of claim 1, where determining the second pace includes:

detecting a portion of the first voice request spoken by the user;

identifying a time period for at least one of the users, of the other client devices, to speak the detected portion; and identifying the second pace based on the identified time period for the at least one of the users, of the other client devices, to speak the detected portion.

8. The method of claim 1, where determining the second pace includes:

detecting one or more terms, spoken by the user, during the first voice request;

identifying a respective period of time for the user to speak each of the one or more terms during a second voice request, received prior to receiving the first voice request; and identifying the second pace based on the respective period of time for the user to speak each of the one or more terms during the second voice request.

9. The method of claim 1, where determining the first pace further includes:

converting the terms, associated with the first voice request, to text at a rate that depends on a pace at which the first voice request is received from the client device; and identifying the first pace based on the rate at which the terms are converted to text.

10. The method of claim 1, where the another pace is of terms spoken by a set of users of a same language, age group, or gender as the user when accessing the voice processing system.

11. The method of claim 1, where the another pace is of terms spoken by a set of users of a same geographic area as the user when accessing the voice processing system.

12. A system, comprising:

one or more server devices to:

obtain, from a client device, a first voice request to access a voice processing system that processes voice communications received from client devices, determine, based on the first voice request, a first pace at which terms, associated with the first voice request, are spoken by a user of the client device, determine a second pace, where the second pace is based on a weighted average of a user pace of terms spoken, by the user when accessing the voice processing system, prior to the first voice request being received, and another pace of terms spoken by users of other client devices, other than the client device, when accessing the voice processing system, wherein a first weight assigned to the user pace is different than a second weight assigned to the another pace;

compare the first pace to the second pace, determine a third pace based on the comparison of the first pace to the second pace, and send, to the client device, a voice response to be outputted at the third pace.

13. The system of claim 12, where the third pace corresponds to:

a faster pace than a medium pace when the first pace is greater than the second pace, the medium pace when the first pace is approximately equal to the second pace, and a slower pace than the medium pace when the first pace is less than the second pace, where the faster pace, the medium pace, and the slower pace are different.

14. The system of claim 13, where the faster pace corresponds to a high-level of perceived urgency associated with the user,
   where the medium pace corresponds to a medium-level of perceived urgency associated with the user, where the medium-level of perceived urgency is less urgent than the high-level of perceived urgency, and
   where the slower pace corresponds to a low-level of perceived urgency associated with the user, where the low-level of perceived urgency is less urgent than the medium-level of perceived urgency.

15. The system of claim 12, where the first voice request includes first video content of the user, and
   where the one or more server devices are further to:
      compare the first video content to second video content, that was received prior to the first video content, where the second video content corresponds to a first level of perceived urgency associated with the user,
      identify a second level of perceived urgency, associated with the user and relative to the first level of perceived urgency, based on the comparison of the first video content to the second video content, and
      send, to the client device, a voice response to be outputted at the third pace based on the first level of perceived urgency and the second level of perceived urgency.

16. The system of claim 12, where, when determining the first pace, the one or more server devices are to:
   identify a quantity of terms within a portion of the first voice request,
   identify a time period associated with the portion, and
   identify the first pace based on the quantity of terms and the identified time period.

17. The system of claim 12, where, when determining the first pace, the one or more server devices are to:
   detect one or more terms associated with the first voice request, and
   identify the first pace based on a respective period of time for the user to speak each of the one or more terms.

18. The system of claim 12, where, when determining the second pace, the one or more server devices are to:
   detect a portion of the first voice request spoken by the user,
   identify a time period for at least one of the users, of the other client devices, to speak the detected portion, and
   identify the second pace based on the identified time period for the at least one of the users, of the other client devices, to speak the detected portion.

19. The system of claim 12, where, when determining the second pace, the one or more server devices are to:
   detect one or more terms, spoken by the user, during the first voice request;
   identify a respective period of time for the user to speak each of the one or more terms during a second voice request, received prior to receiving the first voice request, and
   identify the second pace based on the respective period of time for the user to speak each of the one or more terms during the second voice request.

20. The system of claim 12, where, when determining the first pace, the one or more server devices are to:
   convert the terms, associated with the first voice request, to text at a rate that depends on a pace at which the first voice request is received from the client device, and
   identify the first pace based on the rate at which the terms are converted to text.

21. A non-transitory computer-readable medium, comprising:
   a plurality of instructions which, when executed by one or more processors, cause the one or more processors to:
      obtain, from a client device, a first voice request to access a voice processing system that processes voice communications received from client devices;
      determine, based on the first voice request, a first pace at which terms, associated with the first voice request, are spoken by a user of the client device;
      determine a second pace, where the second pace is based on a weighted average of a user pace of terms spoken, by the user when accessing the voice processing system, prior to the first voice request being received, and another pace of terms spoken by users of other client devices, other than the client device, when accessing the voice processing system, wherein a first weight assigned to the user pace is different than a second weight assigned to the another pace;
      compare the first pace to the second pace;
      determine a third pace based on the comparison of the first pace to the second pace; and
      send, to the client device, a voice response to be outputted at the third pace.

22. The non-transitory computer-readable medium of claim 21, where the third pace corresponds to at least one of:
   a faster pace than a medium pace when the first pace is greater than the second pace,
   the medium pace when the first pace is approximately equal to the second pace, and
   a slower pace than the medium pace when the first pace is less than the second pace, where the faster pace, the medium pace, and the slower pace are different.

23. The non-transitory computer-readable medium of claim 22, where the faster pace corresponds to a high-level of perceived urgency associated with the user,
   where the medium pace corresponds to a medium-level of perceived urgency associated with the user, where the medium-level of perceived urgency is less urgent than the high-level of perceived urgency, and
   where the slower pace corresponds to a low-level of perceived urgency associated with the user, where the low-level of perceived urgency is less urgent than the medium-level of perceived urgency.

24. The non-transitory computer-readable medium of claim 21, where the first voice request includes first video content of the user, and
   where the plurality of instructions which, when executed by the one or more processors, further cause the one or more processors to:
      compare the first video content to second video content, that was received prior to the first video content, where the second video content corresponds to a first level of perceived urgency associated with the user;
      identify a second level of perceived urgency, associated with the user and relative to the first level of perceived urgency, based on the comparison of the first video content to the second video content; and
      send, to the client device, a voice response to be outputted at the third pace based on the first level of perceived urgency and the second level of perceived urgency.

25. The non-transitory computer-readable medium of claim 21, where the one or more instructions, of the plurality of instructions, to determine the first pace, cause the one or more processors to:

identify a quantity of terms within a portion of the first voice request;
identify a time period associated with the portion; and
identify the first pace based on the quantity of terms and the identified time period.

26. The non-transitory computer-readable medium of claim 21, where the one or more instructions, of the plurality of instructions, to determine the first pace, cause the one or more processors to:
detect one or more terms associated with the first voice request; and
identify the first pace based on a respective period of time for the user to speak each of the one or more terms.

27. The non-transitory computer-readable medium of claim 21, where the one or more instructions, of the plurality of instructions, to determine the second pace, cause the one or more processors to:
detect a portion of the first voice request spoken by the user;
identify a time period for at least one of the users, of the other client devices, to speak the detected portion; and
identify the second pace based on the identified time period for the at least one of the users, of the other client devices, to speak the detected portion.

28. The non-transitory computer-readable medium of claim 21, where the one or more instructions, of the plurality of instructions, to determine the second pace, cause the one or more processors to:
detect one or more terms, spoken by the user, during the first voice request;
identify a respective period of time for the user to speak each of the one or more terms during a second voice request, received prior to receiving the first voice request; and
identify the second pace based on the respective period of time for the user to speak each of the one or more terms during the second voice request.

29. The non-transitory computer-readable medium of claim 21, where the one or more instructions, of the plurality of instructions, to determine the first pace, cause the one or more processors to:
convert the terms, associated with the first voice request, to text at a rate that depends on a pace at which the first voice request is received from the client device; and
identify the first pace based on the rate at which the terms are converted to text.

* * * * *